(12) United States Patent
Nakayama et al.

(10) Patent No.: US 12,407,047 B2
(45) Date of Patent: Sep. 2, 2025

(54) BATTERY AND METHOD OF MANUFACTURING SAME

(71) Applicant: TOYOTA JIDOSHA KABUSHIKI KAISHA, Toyota (JP)

(72) Inventors: Hiroyuki Nakayama, Okazaki (JP); Takeyuki Ozaki, Seto (JP); Kohji Umemura, Okazaki (JP)

(73) Assignee: TOYOTA JIDOSHA KABUSHIKI KAISHA, Toyota (JP)

( * ) Notice: Subject to any disclaimer, the term of this patent is extended or adjusted under 35 U.S.C. 154(b) by 263 days.

(21) Appl. No.: 17/563,609

(22) Filed: Dec. 28, 2021

(65) Prior Publication Data

US 2022/0123393 A1 Apr. 21, 2022

Related U.S. Application Data

(62) Division of application No. 16/655,941, filed on Oct. 17, 2019, now abandoned.

(30) Foreign Application Priority Data

Oct. 18, 2018 (JP) .................................. 2018-197011

(51) Int. Cl.
*H01M 50/176* (2021.01)
*H01M 50/55* (2021.01)
(Continued)

(52) U.S. Cl.
CPC ......... *H01M 50/176* (2021.01); *H01M 50/55* (2021.01); *H01M 50/553* (2021.01); *H01M 50/562* (2021.01); *H01M 50/566* (2021.01)

(58) Field of Classification Search
CPC .. H01M 50/176; H01M 50/55; H01M 50/553; H01M 50/562; H01M 50/566
(Continued)

(56) References Cited

U.S. PATENT DOCUMENTS

2007/0275293 A1* 11/2007 Begg ................... H01M 50/152
429/82
2016/0181577 A1 6/2016 Kajiwara et al.
(Continued)

FOREIGN PATENT DOCUMENTS

CN 105830253 A * 8/2016 ............. B23K 26/32
CN 107046109 A 8/2017
(Continued)

OTHER PUBLICATIONS

CN-105830253-A (machine translation) (Year: 2016).*
WO-2013031669-A1 (machine translation) (Year: 2013).*
CN109648198A (translation) (Year: 2019).*

*Primary Examiner* — Matthew T Martin
*Assistant Examiner* — Paul Christian St Wyrough
(74) *Attorney, Agent, or Firm* — Sughrue Mion, PLLC (57) ABSTRACT

A battery case includes a case-penetrating hole. An external terminal includes a member-engaging hole and is stacked on an outside of the battery case so that the member-engaging hole and the case-penetrating hole align with each other. An internal terminal includes a shaft portion and a fastening portion. The shaft portion is inserted through the case-penetrating hole and the member-engaging hole from an interior of the battery. The fastening portion is fastened to a circumferential periphery of the member-engaging hole by crushing a tip end of the shaft portion. The internal terminal is stacked on an inside of the battery case. The fastening portion and the external terminal include a welded portion welded along a weld line set across a periphery of the fastening portion. The welded portion has a length K1 along the weld line and a width K2 along a direction perpendicular to the weld line, and the length K1 is at least 1.5 times longer than the width K2.

6 Claims, 5 Drawing Sheets

(51) Int. Cl.
*H01M 50/553* (2021.01)
*H01M 50/562* (2021.01)
*H01M 50/566* (2021.01)

(58) Field of Classification Search
USPC .......................................................... 429/179
See application file for complete search history.

(56) References Cited

U.S. PATENT DOCUMENTS

| | | | |
|---|---|---|---|
| 2017/0117510 A1* | 4/2017 | Takasu | ............. H01M 10/0431 |
| 2017/0117575 A1 | 4/2017 | Dewulf et al. | |
| 2017/0229686 A1 | 8/2017 | Takasu | |
| 2020/0127247 A1 | 4/2020 | Nakayama | |

FOREIGN PATENT DOCUMENTS

| | | | | |
|---|---|---|---|---|
| CN | 108015422 A | | 5/2018 | |
| CN | 109648198 A | * | 4/2019 | |
| JP | 2013-222621 A | | 10/2013 | |
| WO | WO-2013031669 A1 | * | 3/2013 | ............. B23K 26/22 |
| WO | 2015/025388 A1 | | 2/2015 | |

* cited by examiner

BATTERY AND METHOD OF MANUFACTURING SAME

CROSS REFERENCE TO RELATED APPLICATIONS

This is a divisional of application Ser. No. 16/655,941 filed Oct. 17, 2019, which claims priority from Japanese Patent Application No. 2018-197011 filed on Oct. 18, 2018, which is incorporated by reference herein in its entirety.

BACKGROUND

The present disclosure relates to a battery and a method of manufacturing the battery.

PCT/International Publication No. WO 2013/031669 discloses a battery in which an internal terminal is joined by riveting and an outer peripheral portion of the joined part is additionally welded. The publication describes that this enables the joined part between the internal terminal and an external terminal to provide increased reliability and reduce the internal resistance.

SUMMARY

However, when the internal terminal and the external terminal are welded together by spot welding, as described in WO 2013/031669, the thickness of the weld spot will vary from one location to another. This means that when the weld area is small, the electrical resistance in the joined part increases, resulting in a higher battery internal resistance. For this reason, it is necessary to provide a large weld area in order to reduce the electrical resistance in the joined part and to thereby lower the battery internal resistance.

A battery according to the present disclosure includes a battery case, an external terminal, and an internal terminal. The battery case includes a case-penetrating hole. The external terminal includes a member-engaging hole and is stacked on an outside of the battery case so that the member-engaging hole and the case-penetrating hole align with each other. The internal terminal is stacked on an inside of the battery case, and includes a shaft portion and a fastening portion. The shaft portion is inserted through the case-penetrating hole and the member-engaging hole from an interior of the battery. The fastening portion is fastened to a circumferential periphery of the member-engaging hole at a tip end of the shaft portion. The fastening portion and the external terminal include a welded portion welded along a weld line set across a periphery of the fastening portion. The welded portion has a length K1 along the weld line and a width K2 along a direction perpendicular to the weld line, and the length K1 is at least 1.5 times longer than the width K2. The above-described embodiment of the battery makes it possible to reduce the internal resistance of the battery.

It is possible that a portion of the weld line that is provided external to the fastening portion may be at least 1.5 times longer than a portion of the weld line that is provided internal to the fastening portion. With the above-described embodiment of the battery, the weld area can be increased, and therefore, the internal resistance of the battery can be reduced.

Herein, the at least one welded portion may include at least two or more of the welded portions, and adjacent ones of the welded portions may be circumferentially spaced from each other. The above-described embodiment of the battery makes it possible to further reduce the electrical resistance.

Herein, the welded portion may include an inner edge of the fastening portion, and the inner edge may be located radially outward of the member-engaging hole when viewed axially along the shaft portion. With the above-described embodiment of the battery, the fastened portion is unlikely to be adversely affected by welding.

According to the present disclosure, an embodiment of the method of manufacturing a battery includes the steps of: preparing a battery case including a case-penetrating hole; preparing an external terminal including a member-engaging hole; preparing an internal terminal including a shaft portion; assembling the battery case, the external terminal, and the internal terminal together so that the external terminal is stacked on an outside of the battery case, the internal terminal is stacked on an inside of the battery case, and the shaft portion is inserted through the case-penetrating hole and the member-engaging hole; forming a fastening portion by crushing a tip end of the shaft portion and fastening the tip end of the shaft portion to a circumferential periphery of the member-engaging hole on an outside of the external terminal; and laser welding the fastening portion and the external terminal seamlessly along at least one weld line that is set so as to extend across a periphery of the fastening portion along an outer surface of the fastening portion. The above-described embodiment of the method of manufacturing a battery makes it possible to reduce the internal resistance of the battery.

Herein, in the step of laser welding, a region external to the fastening portion may be laser welded at least 2.5 times longer than a region internal to the fastening portion along the at least one weld line. The above-described embodiment of the method of manufacturing a battery serves to prevent the external terminal from cracking.

Herein, in the step of laser welding, the at least one weld line may be set at two or more locations of the fastening portion that are circumferentially spaced from each other, the fastening portion and the external terminal may be laser welded together along a plurality of the weld lines, and a plurality of welded portions that are circumferentially spaced from each other may be formed by the laser welding. The above-described embodiment of the method of manufacturing a battery serves to reduce the weld defects resulting from the occurrence of spatter.

Herein, in the step of laser welding, the welded portion may not extend into an inside of the member-engaging hole when viewed axially along the shaft portion. With the above-described embodiment of the method of manufacturing a battery, the fastened portion is unlikely to be adversely affected by welding.

DETAILED DESCRIPTION

Hereinbelow, preferred embodiments of the present invention will be described. It should be noted that the following embodiments are merely illustrative of the present invention and the present invention is not limited to the following embodiments. The drawings are schematic illustrations, and do not necessarily reflect any actual product.

Figure 1:
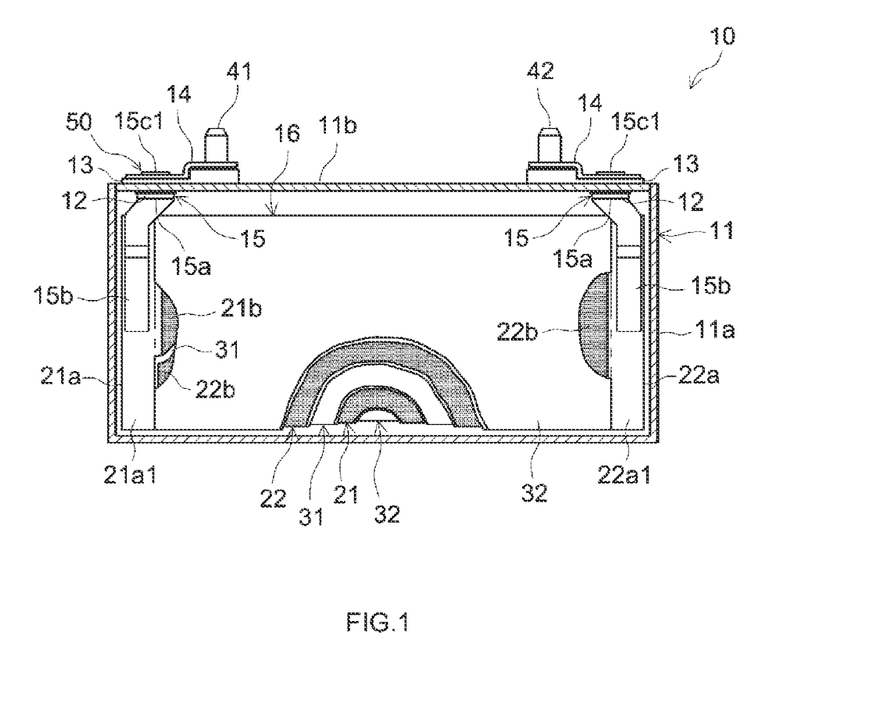
FIG. 1 is a partial cross-sectional view of a battery according to an embodiment of the present disclosure.
Figure 2:
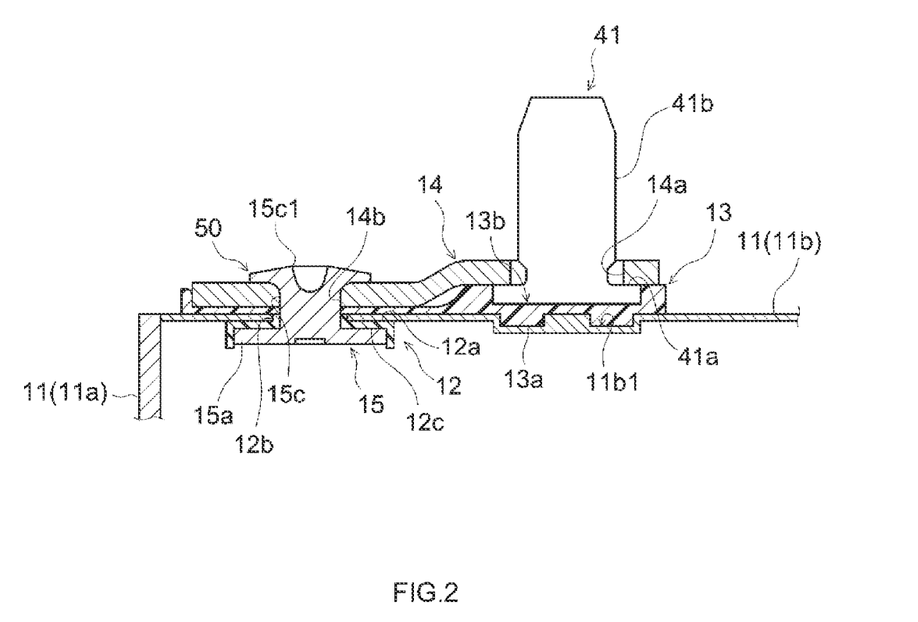
FIG. 2 is a cross-sectional view illustrating a portion where an external terminal and an internal terminal are fitted to a battery case, according to an embodiment of the present disclosure.

FIG. 1 is a partial cross-sectional view of a battery 10 according to one embodiment of the present disclosure. FIG. 1 depicts the interior of the battery 10 that is exposed along one wide side surface of a battery case 11 in substantially a rectangular parallelepiped shape. FIG. 2 is a cross-sectional view illustrating a portion where an external terminal 14 and an internal terminal 15 are fitted to a battery case 11. As illustrated in FIGS. 1 and 2, the battery 10 includes the battery case 11, insulating members 12 and 13, external terminals 14, internal terminals 15, and an electrode assembly 16.

Here, as illustrated in FIG. 1, the external terminals 14 and the internal terminals 15 are fitted to the battery case 11 with the insulating members 12 and 13 interposed therebetween. The battery case 11 encloses the electrode assembly 16 and an electrolyte solution, which is not shown. The electrode assembly 16 is covered with an insulating film or the like, which is not shown, and is enclosed in the battery case 11. Thus, the battery case 11 and the electrode assembly 16 are insulated from each other. The electrode assembly 16 includes a positive electrode element, a negative electrode element, and a separator of the battery 10.

In the present embodiment, a long sheet-shaped positive electrode sheet 21 and a long sheet-shaped negative electrode sheet 22 are stacked with two long sheet-shaped separator sheets 31 and 32 alternately interposed between them, and the positive electrode sheet 21, the negative electrode sheet 22, and the separator sheets 31 and 32 are wound together to form the electrode assembly 16.

The positive electrode sheet 21 includes a positive electrode current collector foil 21a having a predetermined width and a predetermined thickness, a positive electrode active material layer 21b containing a positive electrode active material, and an uncoated portion 21a1 defined along one lateral edge of the positive electrode current collector foil 21a with a constant width. The positive electrode active material layer 21b is formed on both faces of the positive electrode current collector foil 21a, except for the uncoated portion 21a1. In a lithium-ion secondary battery, for example, the positive electrode active material is a material that is capable of releasing lithium ions during charge and absorbing lithium ions during discharge, such as a lithium-transition metal composite oxide. Other than the lithium-transition metal composite oxide, various materials have been proposed for use as the positive electrode active material, and the positive electrode active material is not limited to a particular material.

The negative electrode sheet 22 includes a negative electrode current collector foil 22a having a predetermined width and a predetermined thickness, a negative electrode active material layer 22b containing a negative electrode active material, and an uncoated portion 22a1 defined along one lateral edge of the negative electrode current collector foil 22a with a constant width. The negative electrode active material layer 22b is formed on both faces of the negative electrode current collector foil 22a, except for the uncoated portion 22a1. In a lithium-ion secondary battery, for example, the negative electrode active material is a material that is capable of absorbing lithium ions during charge and releasing the absorbed lithium ions during discharge, such as graphite. Other than graphite, various materials have been proposed for use as the negative electrode active material, and the negative electrode active material is not limited to a particular material.

Each of the separator sheets 31 and 32 may be formed of, for example, an electrolyte permeable porous resin sheet that has required heat resistance. Various proposals have been made about the separator sheets 31 and 32, and there is no particular restriction on the separator sheets 31 and 32.

The electrode assembly 16 is deformed into a flat shape pressed in one direction perpendicular to the winding axis and is enclosed in the battery case 11. Herein, the battery case 11 includes a case main body 11a and a lid 11b. The case main body 11a has a flat prismatic housing region, and one side end thereof is open. The lid 11b has a shape corresponding to the opening of the case main body 11a.

In the electrode assembly 16, the uncoated portion 21a1 of the positive electrode sheet 21 and the uncoated portion 22a1 of the negative electrode sheet 22 protrude laterally in opposite directions from the separators sheets 31 and 32. The uncoated portion 21a1 of the positive electrode current collector foil 21a and the uncoated portion 22a1 of the negative electrode current collector foil 22a are connected to respective internal terminals 15, which are respectively attached to opposite side portions of the battery case 11. The electrode assembly 16 is enclosed in the flat internal space of the case main body 11a. After the electrode assembly 16 is placed therein, the case main body 11a is closed by the lid 11b.

In the present embodiment, as illustrated in FIG. 1, the external terminal 14 and the internal terminal 15 are fitted to each of longitudinally opposite side end portions of the lid 11b. Herein, each of the internal terminals 15 includes a base portion 15a, an attachment piece 15b, and a shaft portion 15c. The base portion 15a is fitted to the lid 11b with an insulating member 12 interposed therebetween. The attachment piece 15b extends from the base portion 15a into the interior of the battery case 11. Referring to FIG. 1, the attachment piece 15b of the internal terminal 15 that is shown on the left side of the figure is welded to the uncoated portion 21a1 of the positive electrode current collector foil 21a of the electrode assembly 16. The attachment piece 15b of the internal terminal 15 that is shown on the right side of the figure is welded to the uncoated portion 22a1 of the negative electrode current collector foil 22a of the electrode assembly 16. On the outside of the lid 11b, the external terminal 14 that is shown on the left side is fitted to a positive electrode connecting terminal 41. The external terminal 14 that is shown on the right side is fitted to a negative electrode connecting terminal 42.

As illustrated in FIG. 2, the lid 11b includes a case-penetrating hole 11c for mounting the external terminal 14 and the internal terminal 15. In addition, a recess 11b1 is formed in an outer surface of the lid 11b at a position at which an insulating member 13 for insulating the external terminal 14 is to be fitted. The same structure is also provided on the negative electrode side of the lid 11 to which the external terminal 14 and the internal terminal 15 are fitted. On the positive electrode side, the external terminal 14, the internal terminal 15, and the connecting terminal 41 are made of aluminum or an aluminum alloy. On the negative electrode side, the external terminal 14, the internal terminal 15, and the connecting terminal 42 are made of copper or a copper alloy.

The insulating members 12 and 13 are fitted around the case-penetrating hole 11c.

The first insulating member 12 is disposed on an inside of the lid 11b to provide electrical insulation between the lid 11b and the internal terminal 15. In the present embodiment, the first insulating member 12 is composed of a resin member having required elasticity. Specifically, the first insulating member 12 is composed of a fluoropolymer. The first insulating member 12 ensures sufficient sealing of the case-penetrating hole 11c. In the present embodiment, as illustrated in FIG. 2, the first insulating member 12 includes a base portion 12a, a tubular portion 12b, and a retaining portion 12c. The base portion 12a is a portion to be fitted on an inner surface of the lid 11b. The tubular portion 12b is a portion of the first insulating member 12 that protrudes from the base portion 12a and is to be fitted onto the inner circumferential surface of the case-penetrating hole 11c. The tubular portion 12b has an internal diameter corresponding to the outer diameter of the shaft portion 15c so that a later-described shaft portion 15c of the internal terminal 15 can be inserted therethrough. The retaining portion 12c is provided to be the lower surface of the first insulating member 12. The retaining portion 12c includes a recess that corresponds to the shape of a later-described base portion 15a of the internal terminal 15. The retaining portion 12c is a portion of the first insulating member 12 on which the base portion 15a is to be positioned.

The second insulating member 13 is disposed on an outside of the lid 11b to provide electrical insulation between the lid 11b and the external terminal 14, and electrical insulation between the lid 11b and the connecting terminal 41. In the present embodiment, the second insulating member 13 is composed of a resin member. Specifically, the second insulating member 13 is composed of a polyamide resin. In this embodiment, the lower surface of the second insulating member 13 is provided with a protruding portion 13a, as illustrated in FIG. 2. The protruding portion 13a is fitted into the recess 11b1 of the lid 11b. The upper surface of the second insulating member 13 is provided with a recess 13b, in which the positive electrode connecting terminal 41 is to be disposed, and a recess 13c, in which the external terminal 14 is to be fitted. The recess 13c, in which the external terminal 14 is to be fitted, includes a through hole 13d formed at a position that corresponds to the case-penetrating hole 11c formed in the lid 11b. The through hole 13d has an internal diameter corresponding to the outer diameter of the shaft portion 15c so that a later-described shaft portion 15c of the internal terminal 15 can be inserted therethrough.

In the present embodiment, the insulating members 12 and 13 are composed of two component parts. However, the insulating members 12 and 13 are component parts that provides electrical insulation between the lid 11b, the external terminal 14, and the internal terminal 15, and it should be noted that the materials, the shapes, and the structures mentioned above are merely examples. The insulating members 12 and 13 may be composed of a single component part. Alternatively, the insulating members 12 and 13 may be composed of a plurality of component parts, such as two or more component parts.

The connecting terminal 41 includes a flange portion 41a and a shaft portion 41b. The flange portion 41a is positioned and fitted into the recess 13b, which is provided in the second insulating member 13, which is disposed on the outside of the lid 11b. Accordingly, the flange portion 41a and the recess 13b may have shapes corresponding to each other. Note that the shaft portion 41b is a part that serves as an output terminal.

In the present embodiment, as illustrated in FIG. 2, the external terminal 14 includes a member-engaging hole 14b and is stacked on an outside of the lid 11b so that the member-engaging hole 14b and the case-penetrating hole 11c align with each other. The external terminal 14 is a plate-shaped member disposed along the longitudinal axis of the lid 11b. The external terminal 14 includes an attachment hole 14a, to which the connecting terminal 41 is attached, and a member-engaging hole 14b, through which the later-described shaft portion 15c of the internal terminal 15 is inserted. The member-engaging hole 14b is formed at a position corresponding to the through hole 13d of the second insulating member 13 under conditions where the external terminal 14 is placed on the second insulating member 13. Thus, in the present embodiment, the external terminal 14 is stacked on the outside of the lid 11b with the second insulating member 13 interposed therebetween, because the lid 11b is an electrically conductive member.

In the present embodiment, the internal terminal 15 includes a shaft portion 15c and a fastening portion 15c1 and is stacked on the inside of the lid 11b. The shaft portion 15c is inserted through the case-penetrating hole 11c and the member-engaging hole 14b from the interior of the battery case 11. The fastening portion 15c1 is a portion of the shaft portion 15c that is fastened to a circumferential periphery of the member-engaging hole 14b by crushing a tip end of the shaft portion 15c. As illustrated in FIGS. 1 and 2, the internal terminal 15 includes a base portion 15a, an attachment piece 15b, and a shaft portion 15c. Of these, the base portion 15a is fitted to the lid 11b with the first insulating member 12 interposed therebetween. The details of the attachment piece 15b have already been described and therefore will not be repeated herein.

Figure 3:
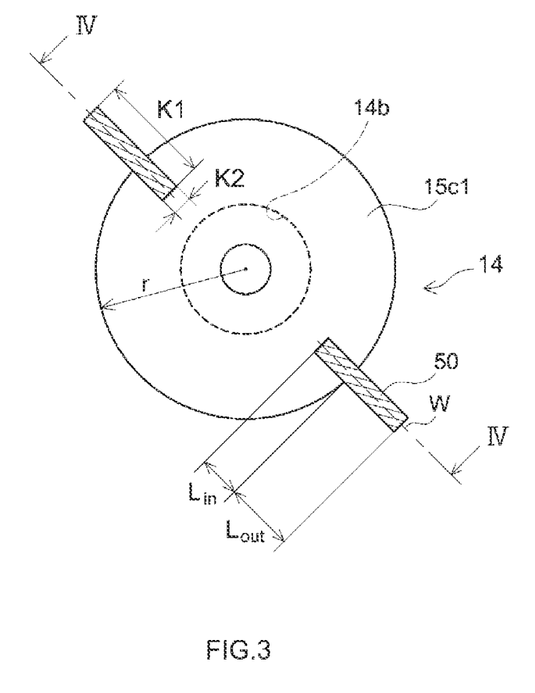
FIG. 3 is a partial plan view illustrating a welded portion formed in a fastening portion of the internal terminal and the external terminal, according to an embodiment of the present disclosure.

FIG. 3 is a partial plan view illustrating welded portions 50 formed in the fastening portion 15c1 of the internal terminal 15 and the external terminal 14, according to the present embodiment. In FIG. 3, the welded portions are enlarged to facilitate understanding. In the present embodiment, as illustrated in FIGS. 2 and 3, the fastening portion 15c1 and the external terminal 15 include welded portions 50 that are seamlessly welded by using laser light along a weld line W that is set across the periphery of the fastening portion 15c1. Herein, the term "weld line W" refers to a scanning line of the laser beam in laser welding. The weld line W may appear as a line through the center of the weld width of the welded portion 50, for example. In the present embodiment, each of the welded portions 50 has a length K1 along the weld line W and a width K2 along a direction perpendicular to the weld line W, and the length K1 is greater than the width K2. In the present embodiment, the length K1 is set to be approximately from 1.5 times to 4 times the width K2. As a result, the welded portion 50 can be distinguished from one that is formed by simply spot welding the boundary portion between the fastening portion 15c1 and the external terminal 14.

In the present embodiment, the weld is formed along the weld line W that is set across the periphery of the fastening portion 15c1. Therefore, each of the welded portions 50 is formed across the periphery of the fastening portion 15c1. In this case, the external terminal 14 is sufficiently fused not only in an inside part of the fastening portion 15c1 but also in an outside part of the fastening portion 15c1 so that the fastening portion 15c1 and the external terminal 14 are welded to each other. More specifically, the metal in the fastening portion 15c1 that is fused by laser welding flows along the outer surface of the fastening portion 15c1, which is in an umbrella-like shape, to the external terminal 14, and is mixed with the fused metal on the external terminal 14 side, to effect welding. As a result, the weld area can be made larger than, for example, the case where the boundary portion between the fastening portion 15c1 and the external terminal 14 is simply spot welded. Moreover, electrical continuity between the external terminal 14 and the fastening portion 15c1 of the internal terminal 15 can be ensured more reliably, and moreover, the electrical resistance between them can be further reduced. Therefore, the weld area can be made larger in comparison with the case of spot welding, and as a result, the internal resistance of the battery can be reduced. In order to obtain such an advantageous effect, the welded portion 50 may be such that the length K1 along the weld line W is greater than the width K2 along a direction perpendicular to the weld line W. For example, the length K1 may be at least 1.5 times, more preferably at least 2 times, still more preferably at least 2.5 times the width K2. Such a welded portion may be embodied by, for example, performing laser welding while shifting the position to which laser is applied along the weld line W.

Figure 4:
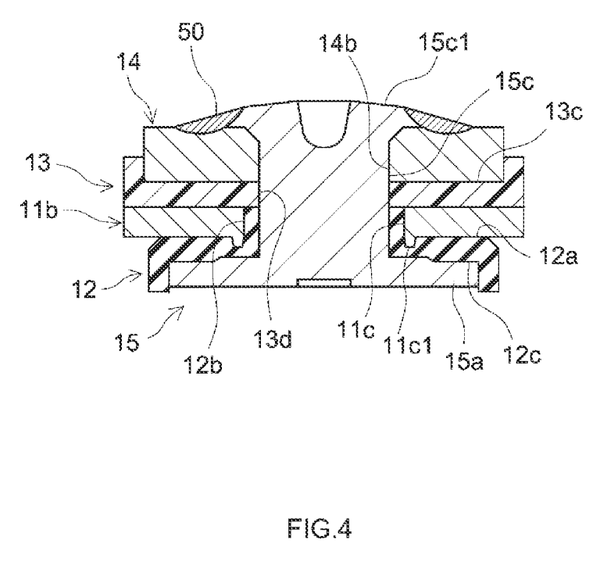
FIG. 4 is a cross-sectional view taken along line IV-IV in FIG. 3, showing a fastening portion 15c1.

FIG. 4 is a cross-sectional view taken along line IV-IV in FIG. 3, showing a fastening portion 15c1. The shaft portion 15c of the internal terminal 15 is inserted through the case-penetrating hole 11c of the lid 11b and the member-engaging hole 14b of the external terminal 14. The tip end of the shaft portion 15c is crushed and fastened to a circumferential periphery of the member-engaging hole 14b that is on the outside of the external terminal 14. The tip end of the shaft portion 15c is deformed so as to spread into an umbrella-like shape to form the fastening portion 15c1. As a result, the internal terminal 15 is secured so as to clamp the first insulating member 12, the lid 11b, the second insulating member 13, and the external terminal 14 between the base portion 15a and the fastening portion 15c1.

Of the weld line W, a weld line $L_{out}$ that is provided external to the fastening portion 15c1 may be set longer than a weld line $L_{in}$ that is provided internal to the fastening portion 15c1. For example, the weld line $L_{out}$, which is provided external to the fastening portion 15c1, may be set to be at least 2.5 times longer than the weld line $L_{in}$, which is provided internal to the fastening portion 15c1. In other words, a portion of the welded portion 50 that is provided external to the fastening portion 15c1 may have a length along the weld line W at least 2.5 times longer than a portion of the welded portion 50 that is provided internal to the fastening portion 15c1. Here, the distance from the center of the shaft portion 15c of the internal terminal 15 to the outer periphery of the fastening portion 15c1 is defined as the distance r from the center of the fastening portion 15c1 to the outer periphery of the fastening portion 15c1. The weld line $L_{out}$, which is provided external to the fastening portion 15c1, may be at least 0.25 times, preferably at least 0.3 times, the distance R from the center of the fastening portion 15c1 to the outer periphery thereof. On the other hand, the weld line $L_{in}$, which is provided internal to the fastening portion 15c1, may be at least 0.1 times, preferably at least 0.15 times, the distance R from the center of the fastening portion 15c1 to the outer periphery thereof.

It should be noted that, when the fastening portion 15c1 is in a substantially circular shape centered about the center of the shaft portion 15c of the internal terminal 15, the distance r from the center of the fastening portion 15c1 to the outer periphery thereof can be approximately the radius of the fastening portion 15c1. Thus, because the weld line $L_{out}$ provided external to the fastening portion 15c1 is set longer than the weld line $L_{in}$ provided internal to the fastening portion 15c1, the weld area is increased further, and the electrical resistance is reduced. Also, because the metal on the external terminal 14 side is fused in a greater amount in a region external to the fastening portion 15c1, the thermal strain that may occur in the external terminal 14 is reduced, so that the quality of the external terminal 14 can be kept high.

As illustrated in FIG. 4, the welded portion 50 may be provided at only one location. It is also possible that two or more of the welded portions 50 may be provided at respective locations. In that case, it is desirable that the welded portions 50 be circumferentially spaced from each other. With the numbers of the welded portions being equal, such a configuration provides a larger weld area than the case where the welded portions 50 are circumferentially overlapped with each other, and therefore allows the electrical resistance to be kept even lower.

The region in which the external terminal 14 and the shaft portion 15c of the internal terminal 15 are in contact with each other is under the force exerted by fastening. In the present embodiment, the inner edge of the fastening portion 15c1 within the welded portion may be located radially outward of the member-engaging hole 14b when viewed axially along the shaft portion 15c. With such a configuration, welding is unlikely to adversely affect the region that is fastened by the fastening force. As a result, the joining of the external terminal 14 and the internal terminal 15 that is effected by fastening can be kept firmly. From such viewpoints, the inner edge of the fastening portion of the welded portion is set to be located at least 1.1 times, more preferably at least 1.2 times, further outward than the radius of the member-engaging hole when viewed axially along the shaft portion.

Figure 5:
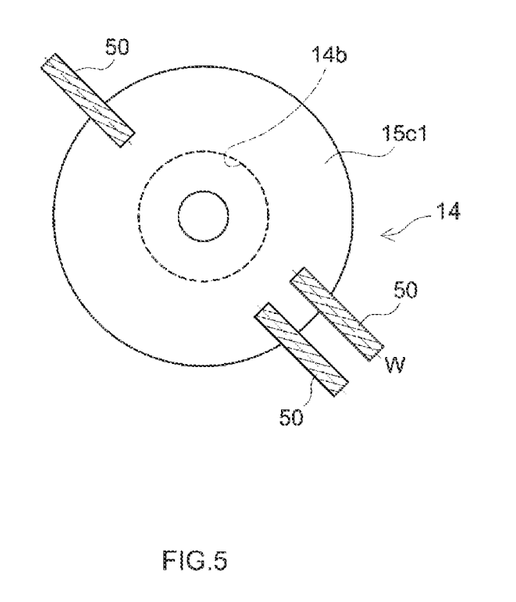
FIG. 5 is a partial plan view illustrating a welded portion formed in the fastening portion of the internal terminal and the external terminal, according to a modified embodiment of the present disclosure.

In the foregoing embodiment, the weld line W extends in a radial direction, and the center of the shaft portion 15c is on an extension line of the weld line W. However, the present disclosure is not limited thereto. FIG. 5 is a partial plan view illustrating welded portions 50 formed in the external terminal and the fastening portion of the internal terminal, according to a modified embodiment of the present disclosure. As illustrated in FIG. 5, the weld line W may be set to be offset from a line along a radial direction through the center of the shaft portion 15c in a direction perpendicular to the radial direction. In addition, the weld line W is not limited to a straight line but may be set to be a curved line.

In the foregoing embodiment, the welded portions 50 are provided symmetrically. However, the present disclosure is not limited thereto. As illustrated in FIG. 5, the numbers and the locations of the welded portions 50 may be asymmetrical.

In the foregoing embodiment, the external terminal 14 and the internal terminal 15 are provided on the lid 11b. However, the present disclosure is not limited thereto, and the external terminal 14 and the internal terminal 15 may be provided on the battery case 11.

The external terminal 14 and the internal terminal 15 may be made of dissimilar materials. For example, in secondary batteries that have a charge potential such that the open circuit voltage of the positive electrode and the negative electrode is about 4 V, the electrode terminal on the positive electrode uses aluminum or an aluminum alloy that can withstand a required voltage. In such cases, dissimilar materials may be used for the external terminal 14 and the internal terminal 15. For example, in the embodiment shown in FIGS. 2 and 3, the internal terminal 15 of the positive electrode that includes the shaft portion 15c, which needs to be crushed, may use aluminum, which is relatively a soft material. On the other hand, the external terminal 14 may use an aluminum alloy that shows excellent corrosion resistance and strength.

A method of manufacturing a battery that includes such a welded portion 50 will be described below. In the method of manufacturing a battery herein, a battery case 11 including a case-penetrating hole 11c, an external terminal 14 including a member-engaging hole 14b, and an internal terminal 15 including a shaft portion 15c are prepared.

Next, the battery case 11, the external terminal 14, and the internal terminal 15 are assembled together. In this step, the external terminal 14 is placed on an outside of the battery case 11, the internal terminal 15 is placed on an inside of the battery case 11, and the shaft portion 15c is inserted through the case-penetrating hole 11c and the member-engaging hole 14b. In the preferred embodiment, the first insulating member 12 is internal terminal between the battery case 11 and the internal terminal 15. The second insulating member 13 is interposed between the battery case 11 and the external terminal 14.

Specifically, the external terminal 14 is placed on the outside of the lid 11b so that the second insulating member 13 is interposed therebetween and also the positions of the case-penetrating hole 11c and the member-engaging hole 14b are aligned with each other. Next, the internal terminal 15 is placed on the inside of the lid 11b so that the first insulating member 12 is interposed therebetween and the shaft portion 15c of the internal terminal 15 is inserted through the case-penetrating hole 11c and the member-engaging hole 14b.

Subsequently, a tip end of the shaft portion 15c is crushed and fastened to the circumferential periphery of the member-engaging hole 14b that is on the outside of the external terminal 14, to form the fastening portion 15c1. Thus, the internal terminal 15 is secured so as to clamp the first insulating member 12, the lid 11b, the second insulating member 13, and the external terminal 14 between the base portion 15a and the fastening portion 15c1.

Then, the fastening portion 15c1 and the external terminal 14 are seamlessly laser welded along the weld line W that is set so as to extend across the periphery of the fastening portion 15c1 along the outer surface of the fastening portion 15c1. In such a configuration, the fastening portion 15c1 is in an umbrella-like shape. Therefore, the metal of the fastening portion 15c1 that is fused by the laser light flows toward the external terminal 14. Also, the external terminal 14 is fused by the laser light in a region external to the fastening portion 15c1, so the metal of the fastening portion 15c1 is mixed and welded with the metal of the external terminal 14. As a result, the weld area is increased and the electrical resistance is reduced, so that the internal resistance of the battery 10 is reduced.

The welded portion may be provided at either one location or two or more locations. When a plurality of locations are to be welded by laser light, a plurality of welded portions may be provided so as to be spaced from each other along a circumferential direction of the fastening portion 15c1. In that case, for example, in the step of laser welding the fastening portion 15c1 and the external terminal 14 to each other, weld lines W may be set at two or more locations that are spaced along a circumferential direction of the fastening portion 15c1, and the fastening portion 15c1 and the external terminal 14 may be laser welded to each other along the plurality of weld lines W. When a plurality of welded portions are formed so as to be spaced from each other along a circumferential direction of the fastening portion 15c1 in this way, the occurrence of spatter resulting from the heat input in welding can be reduced, and accordingly, weld defects can be reduced.

In the step of seamlessly laser welding the fastening portion 15c1 and the external terminal 14, a region that is to be laser welded may be set to be at least 2.5 times longer in a region external to the fastening portion 15c1 than in a region internal to the fastening portion 15c1. In this case, the weld line $L_{out}$ that is provided external to the fastening portion 15c1 may be set at least 2.5 times longer than the weld line $L_{in}$ that is provided internal to the fastening portion 15c1. When the external terminal 14 and the fastening portion 15c1 are made of dissimilar materials, their thermal expansion coefficients may be different. When that is the case, as the welded portion 50 fused by the laser light undergoes heat shrinkage according to a temperature drop, a thermal stress resulting from the difference in thermal expansion occurs between the external terminal 14 and the welded portion 50. When the region that is to be laser welded is set to be at least 2.5 times longer in a portion external to the fastening portion 15c1 than that in a portion internal to the fastening portion 15c1 as described above, it means that the external terminal 14 is fused in a wider area. This serves to lessen the temperature dropping rate of the welded portion 50. Therefore, even if the welded portion 50 undergoes heat shrinkage, the thermal stress produced in and around the welded portion 50 is kept small.

In addition, in the step of laser welding the fastening portion 15c1 and the external terminal 14 to each other, the fastening portion 15c1 and the external terminal 14 are welded so that the welded portion 50 does not extend into the inside of the member-engaging hole 14 when viewed axially along the shaft portion 15c. In other words, the inner edge of the fastening portion of the welded portion is set to be located at least 1.1 times further outward than the radius of the member-engaging hole when viewed axially along the shaft portion. With such an embodiment, laser welding is unlikely to adversely affect the region of the fastening portion 15c1 that is under a fastening force. As a result, the joining of the external terminal 14 and the internal terminal 15 that is effected by fastening is kept firmly.

Although various embodiments of the battery and the method of manufacturing the battery have been described hereinabove according to the present disclosure, it should be noted that, unless specifically stated otherwise, the embodiments and the examples described herein do not limit the scope of the present invention.

What is claimed is:

1. A method of manufacturing a battery, comprising the steps of;
    preparing a battery case including a case-penetrating hole;
    preparing an external terminal including a member-engaging hole;
    preparing an internal terminal including a shaft portion;
    assembling the battery case, the external terminal, and the internal terminal together so that the external terminal is stacked on an outside of the battery case, the internal terminal is stacked on an inside of the battery case, and the shaft portion is inserted through the case-penetrating hole and the member-engaging hole;
    forming a fastening portion by crushing a tip end of the shaft portion and fastening the tip end of the shaft portion to a circumferential periphery of the member-engaging hole on an outside of the external terminal; and laser welding the fastening portion and the external terminal seamlessly along a plurality of weld lines that are set at two or more locations of the fastening portion that are circumferentially spaced from each other and that are set so as to extend across a periphery of the fastening portion in a radial direction along an outer surface of the fastening portion by continuously shifting a position to which a laser is applied along each of the weld lines, wherein, in the step of laser welding of each weld line, welded portion has a length of K1 along the weld line in the radial direction and a width of K2 along a direction perpendicular to the weld line, and the length K1 is at least 1.5 times longer than the width of K2, in the step of laser welding of each weld line, a region that is to be laser welded is set to be at least 2.5 times longer in a region external to the fastening portion than in a region internal to the fastening portion, and in the step of laser welding of each weld line, the welded portion does not extend into an inside of the member-engaging hole when viewed axially along the shaft portion.

2. The method according to claim 1, wherein the welded portion is disposed on a top surface of the fastening portion and a top surface of the external terminal.

3. The method according to claim 1, wherein the laser welding is performed while continuously shifting the position to which the laser is applied along the weld line such that no spot-shaped welding marks remain after laser welding.

4. The method according to claim 1, wherein the plurality of welds are circumferentially spaced from each other at varying intervals.

5. The method according to claim 1, wherein the plurality of welds are circumferentially spaced from each other in an asymmetrical pattern.

6. The method according to claim 1, the fastening portion is an umbrella shape where a center portion of the fastening portion is raised from an edge portion of the fastening portion.

* * * * *